(12) United States Patent
Gardner et al.

(10) Patent No.: US 10,606,736 B1
(45) Date of Patent: Mar. 31, 2020

(54) SYSTEM AND METHOD FOR AUTOMATED CREATION OF A LOAD TEST PLAN

(71) Applicant: Akamai Technologies, Inc., Cambridge, MA (US)

(72) Inventors: Kenneth C. Gardner, Menlo Park, CA (US); Daniel Bartow, North Canton, OH (US); Benjamin D. Polovick, Temecula, CA (US)

(73) Assignee: Akamai Technologies Inc., Cambridge, MA (US)

( * ) Notice: Subject to any disclaimer, the term of this patent is extended or adjusted under 35 U.S.C. 154(b) by 0 days.

(21) Appl. No.: 15/449,061

(22) Filed: Mar. 3, 2017

(51) Int. Cl.
*G06F 11/36* (2006.01)
*G06F 11/30* (2006.01)
*G06F 11/34* (2006.01)

(52) U.S. Cl.
CPC ........ *G06F 11/3684* (2013.01); *G06F 11/302* (2013.01); *G06F 11/3006* (2013.01); *G06F 11/3433* (2013.01); *G06F 11/3457* (2013.01); *G06F 11/3612* (2013.01)

(58) Field of Classification Search
CPC .......................... G06F 11/3414; G06F 11/3684
USPC ....................................................... 714/38.1
See application file for complete search history.

(56) References Cited

U.S. PATENT DOCUMENTS

| | | | |
|---|---|---|---|
| 6,477,483 B1 * | 11/2002 | Scarlat | G06F 11/3414 702/186 |
| 6,738,933 B2 | 5/2004 | Fraenkel et al. | |
| 6,775,824 B1 * | 8/2004 | Osborne, II | G06F 11/3664 714/46 |
| 7,050,056 B2 | 5/2006 | Meyringer | |
| 7,231,606 B2 * | 6/2007 | Miller | H04L 43/50 702/186 |
| 7,630,862 B2 | 12/2009 | Glas et al. | |
| 7,743,128 B2 | 6/2010 | Mullarkey | |
| 7,844,036 B2 | 11/2010 | Gardner et al. | |
| 8,341,462 B2 | 12/2012 | Broda et al. | |
| 8,479,122 B2 | 7/2013 | Hotelling et al. | |
| 8,510,600 B2 | 8/2013 | Gardner et al. | |

(Continued)

FOREIGN PATENT DOCUMENTS

CN   102769674 A   * 11/2012

OTHER PUBLICATIONS

U.S. Appl. No. 14/688,245.

(Continued)

*Primary Examiner* — Chae M Ko (57) ABSTRACT

A computer-implemented method for creation of a test plan for load testing a website includes receiving a set of input parameters, which includes a specified time period range. Beacon data of real user sessions on the website that fall within the specified time period range is retrieved from a data storage repository. A set of peak traffic time periods, which includes a peak day, a peak hour, a peak minute, and a peak second, is identified. User session statistics are calculated for the peak day, the user session statistics including median session duration, session length, and think times. A page group distribution table is generated that includes a list of all page groups and page group hit percentages, relative to all other page groups, for the real user sessions during the peak hour. A set of test scenario paths representative of the page group distribution table is then generated.

9 Claims, 7 Drawing Sheets

(56) References Cited

U.S. PATENT DOCUMENTS

| | | | |
|---|---|---|---|
| 9,015,348 B2 | 4/2015 | Hofmann et al. | |
| 9,021,362 B2 | 4/2015 | Tellis et al. | |
| 9,154,611 B1 | 10/2015 | Jackson et al. | |
| 9,229,842 B2 | 1/2016 | Broda et al. | |
| 9,251,035 B1* | 2/2016 | Vazac | G06F 11/3495 |
| 9,384,121 B2 | 7/2016 | Jackson et al. | |
| 9,436,579 B2 | 9/2016 | Hemmert et al. | |
| 9,450,834 B2 | 9/2016 | Gardner et al. | |
| 9,459,980 B1* | 10/2016 | Arguelles | G06Q 10/06 |
| 9,491,248 B2 | 11/2016 | Broda et al. | |
| 9,495,473 B2 | 11/2016 | Gardner et al. | |
| 9,720,569 B2 | 8/2017 | Gardner et al. | |
| 9,772,923 B2 | 9/2017 | Tellis et al. | |
| 9,882,793 B2 | 1/2018 | Broda et al. | |
| 9,942,105 B2 | 4/2018 | Gardner et al. | |
| D820,297 S | 6/2018 | Gardner et al. | |
| 9,990,110 B1 | 6/2018 | Lounibos et al. | |
| 10,037,393 B1 | 7/2018 | Polovick et al. | |
| 10,067,850 B2 | 9/2018 | Vazac et al. | |
| 10,114,915 B2 | 10/2018 | Polovick et al. | |
| 10,177,999 B2 | 1/2019 | Broda et al. | |
| 2002/0138226 A1* | 9/2002 | Doane | G06F 11/2294 |
| | | | 702/119 |
| 2002/0147937 A1 | 10/2002 | Wolf | |
| 2003/0074161 A1 | 4/2003 | Smocha et al. | |
| 2003/0109951 A1 | 6/2003 | Hsiung et al. | |
| 2004/0039550 A1 | 2/2004 | Myers | |
| 2004/0059544 A1 | 3/2004 | Smocha et al. | |
| 2004/0123320 A1 | 6/2004 | Daily et al. | |
| 2005/0216234 A1 | 9/2005 | Glas et al. | |
| 2006/0229931 A1 | 10/2006 | Fligler et al. | |
| 2007/0288205 A1 | 12/2007 | Vazquez et al. | |
| 2008/0066009 A1 | 3/2008 | Gardner et al. | |
| 2008/0140347 A1 | 6/2008 | Ramsey et al. | |
| 2008/0189408 A1 | 8/2008 | Cancel et al. | |
| 2009/0055522 A1* | 2/2009 | Shen | G06F 11/3433 |
| | | | 709/224 |
| 2010/0023867 A1 | 1/2010 | Coldiron et al. | |
| 2011/0066892 A1 | 3/2011 | Gardner et al. | |
| 2011/0202517 A1 | 8/2011 | Reddy et al. | |
| 2012/0017112 A1* | 1/2012 | Broda | G06F 9/5083 |
| | | | 714/4.4 |
| 2012/0017156 A1 | 1/2012 | Broda et al. | |
| 2012/0017165 A1 | 1/2012 | Gardner et al. | |
| 2012/0023429 A1 | 1/2012 | Medhi | |
| 2012/0166634 A1 | 6/2012 | Baumback et al. | |
| 2012/0246310 A1 | 9/2012 | Broda et al. | |
| 2013/0097307 A1* | 4/2013 | Vazac | G06F 11/3414 |
| | | | 709/224 |
| 2013/0116976 A1 | 5/2013 | Kanemasa et al. | |
| 2013/0166634 A1 | 6/2013 | Holland | |
| 2014/0033055 A1* | 1/2014 | Gardner | H04L 41/22 |
| | | | 715/736 |
| 2014/0189320 A1 | 7/2014 | Kuo | |
| 2014/0280880 A1 | 9/2014 | Tellis et al. | |
| 2015/0067527 A1 | 3/2015 | Gardner et al. | |
| 2015/0222494 A1 | 8/2015 | Broda et al. | |
| 2015/0319071 A1 | 11/2015 | Kaasila et al. | |
| 2016/0226969 A1 | 8/2016 | Jain et al. | |
| 2017/0315902 A1* | 11/2017 | Moretto | G06F 11/3672 |
| 2018/0011774 A1 | 1/2018 | Vazac et al. | |
| 2018/0246626 A1 | 8/2018 | Lounibos et al. | |

OTHER PUBLICATIONS

U.S. Appl. No. 15/862,503.
U.S. Appl. No. 14/668,928.
U.S. Appl. No. 15/066,969.
U.S. Appl. No. 15/155,185.
U.S. Appl. No. 15/441,718.
U.S. Appl. No. 15/449,061.
U.S. Appl. No. 15/591,353.
U.S. Appl. No. 15/668,002.
U.S. Appl. No. 15/448,954, filed Mar. 3, 2017.

* cited by examiner

|   |              | Sessions | Page Views | Conversions | Timestamp           |
|---|--------------|----------|------------|-------------|---------------------|
| 1 | Peak day     | 246,235  | 2,216,115  | 11,310      | 11-30-2015          |
| 2 | Peak hour    | 26,765   | 240,885    | 1,862       | 11-30-2015 13:00:00 |
| 3 | Peak minute  | 16,234   | 4014       | 273         | 11-30-2015 13:21:00 |
| 4 | Peak second  | 15,256   | 415        | 8           | 11-30-2015 13:21:19 |

FIG. 1

Session Information (From peak day - 11-30-2015)

|   |                  | MEDIAN  | MAD       |
|---|------------------|---------|-----------|
| 1 | Session Duration | 1m 25s  | 1m 17s    |
| 2 | Session Length   | 3 pages | 2.0 pages |
| 3 | Think Time       | 22s     | 16s       |

FIG. 2

Page Group Distribution (Based on peak hour - 11-30-2015 13:00:00)

|    | Page Group         | Hits   | Percentage |
|----|--------------------|--------|------------|
| 1  | Product page       | 236002 | 29.97      |
| 2  | Boutiques          | 182019 | 21.57      |
| 3  | Category           | 143295 | 19.98      |
| 4  | Home               | 74789  | 8.86       |
| 5  | Search Results     | 72333  | 8.57       |
| 6  | Shopping Bag       | 56519  | 6.7        |
| 7  | Sign-In or Address | 13630  | 1.62       |
| 8  | (No Page Group)    | 12162  | 1.44       |
| 9  | Coupons            | 9035   | 1.07       |
| 10 | Payment or Address | 7797   | 0.92       |
| 11 | Order Billing      | 6195   | 0.73       |
| 12 | Promo Details      | 5468   | 0.65       |
| 13 | Store Locator      | 3835   | 0.65       |

FIG. 3

| Track | Scenario and Think Times | Virtual Users | % | Geo. Location | Ramp Time | Clip Length |
|---|---|---|---|---|---|---|
| 1 | Home (32s) → Product Page (73s) | 1100 | 40.7% | [multiple] | 15 min. | 1m 45s |
| 1a | | 1000 | 37% | Amazon US East | 15 min. | 1m 45s |
| 1b | | 100 | 3.7% | Amazon US West 1 | 15 min. | 1m 45s |
| 2 | Sign In (19s) → Account Info (81s) | 110 | 4% | [multiple] | 15 min. | 1m 40s |
| 2a | | 100 | 3.7% | Amazon US East | 15 min. | 1m 40s |
| 2b | | 10 | 0.3% | Amazon US West 1 | 15 min. | 1m 40s |
| 3 | Home Page (25s) → Product Page (11s) → Cart (23s) → Product Page (35s) → Cart (89s) | 550 | 20.7% | [multiple] | 15 min. | 3m 3s |
| 3a | | 500 | 18.9% | Amazon US East | 15 min. | 3m 3s |
| 3b | | 50 | 1.8% | Amazon US West 1 | 15 min. | 3m 3s |
| 4 | Product Page (29s) → Cart (60s) | 300 | 12.4% | [multiple] | 15 min. | 1m 29s |
| 4a | | 270 | 11.3% | Amazon US East | 15 min. | 1m 29s |
| 4b | | 30 | 1.12% | Amazon US West 1 | 15 min. | 1m 29s |
| 5 | Home Page (27s) → Product Page (27s) → Cart (25s) → Checkout (72s) → Order Review (29s) → Order Conf. (61s) | 200 | 8.25% | [multiple] | 15 min. | 4m 1s |

| Track | Scenario and Think Times | Virtual Users | % | Geo. Location | Ramp Time | Clip Length |
|---|---|---|---|---|---|---|
| 5a | | 80 | 7.5% | Amazon US East | 15 min. | 4m 1s |
| 1a | | 20 | 0.75% | Amazon US West 1 | 15 min. | 4m 1s |
| 6 | Home Page (17s) → Product Page (24s) → Cart (26s) ↑ Log In (16s) → Order Review (26s) ↑ Order Conf. (63s) | 200 | 8.25% | [multiple] | 15 min. | 2m 52s |
| 6a | | 180 | 7.5% | Amazon US East | 15 min. | 2m 52s |
| 6b | | 20 | 0.75% | Amazon US West 1 | 15 min. | 2m 52s |
| 7 | Bounce Path | 100 | 4% | [multiple] | 15 min. | 1s |
| 7a | | 90 | 3.7% | Amazon US East | 15 min. | 1s |
| 7b | | 10 | 0.3% | Amazon US West 1 | 15 min. | 1s |
| Total | | 2640 | 100% | | | |

SYSTEM AND METHOD FOR AUTOMATED CREATION OF A LOAD TEST PLAN

TECHNICAL FIELD

The present disclosure relates generally to the field of cloud computing; more particularly, to automated systems and methods for load testing of websites and/or web applications.

BACKGROUND

Load testing of websites and web applications generally refers to the process of putting demand on a software system or computing device (e.g., website server) and measuring its response. Load testing is commonly performed to determine a system's behavior under both normal and anticipated peak load conditions. A typical load test typically subjects a target website to different numbers of virtual users while monitoring performance measurements under these different loads. The virtual users simulate multiple real users accessing the program concurrently. The virtual users are typically generated by specialized software running on servers or machine instances provisioned in a network cloud. The software executes a specific load test plan or script that has been created by a test analyst or engineer.

By way of example, U.S. Pat. No. 7,844,036 describes a cloud-based load testing system and method for websites and web applications that allows a user to create a load test composition that includes plurality of parallel message streams that is sent over a network to a target website. CloudTest® is a cloud-based load testing computer program product offered by SOASTA, Inc. that allows a user to design, edit, and execute a load test composition on a website.

One of the difficulties with load testing is designing the test script or composition in such a way as to identify the maximum operating capacity of a website or web application as well as any bottlenecks that might interfere with its operating at capacity. The problem faced by performance engineers is how to create a set of test plan scenarios that accurately simulate peak load conditions that are likely to occur under real use. The conventional approach involves a performance engineer or analyst manually identifying commonly-executed scenarios for a website from market research or by examining log files.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as data analysis platforms, method steps, algorithms, metrics, statistics, etc., in order to provide a thorough understanding of the subject matter disclosed herein. However, persons having ordinary skill in the relevant arts will appreciate that these specific details may not be needed to practice the present invention. It should also be understood that the elements in the FIGS. are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure.

The term "server" broadly refers to any combination of hardware or software embodied in a computer designed to provide services to client devices or processes. A server therefore can refer to a computer that runs a server operating system from computer-executable code stored in a memory, and which is provided to the user as a virtualized or non-virtualized machine; it can also refer to any software or dedicated hardware capable of providing computing services. A web server is an information technology that processes requests via HTTP, the basic network protocol used to distribute information on the World Wide Web. A webpage is a web document that is suitable for the World Wide Web. A web browser running on a client or user computing device displays a web page on a monitor or mobile device screen.

In the context of the present disclosure, a "mobile computing device" or "mobile device" (for short) refers to any one of a number of different portable electronic devices having a touch-sensitive display with a graphical user interface (GUI), one or more processors, memory and one or more modules, programs or sets of instructions for performing methods associated with the operations described herein. A mobile computing device typically runs on an operating system executed on one or more processors, and may also run one or more applications installed or resident in memory (e.g., firmware, RAM, EEPROM, etc.) In some embodiments, the mobile computing device may provide a plurality of functions including wireless communication, thereby allowing a user of the mobile device access data and information via connection to the Internet. Mobile computing devices include smartphones, tablet computers, wearable computers, ultra-mobile PCs, personal digital assistants, other hand-held devices, as well as other mobile computers (e.g., carputers) that have touch screen interfaces with wireless capabilities.

A "landing page" is any webpage on a website that serves as the initial point of entry for a user to the website. The landing page is typically the homepage, and is commonly accessible by clicking on a hyperlink on another web page, by clicking on a search engine search result, or by inputting a HTTP address of a website to a browser application. Other types of common landing pages include category pages, which typically serve as product overview pages that link to an individual service, product or Stocking Keeping Unit (SKU) page, and product pages, where you see SKU or service details, and where visitor can add an item to a shopping cart.

A "load time" of a webpage is defined as the time (usually in milliseconds) from the start of the page navigation to the Page Onload event, i.e., when the webpage is considered ready. The term "think time" refers to the time between the browser displaying a page to the user and the user clicking a link to browse to a new page. This time is usually the time it takes the user to read the content of the page and to decide what to do next.

The term "real-time" refers to a level of computer responsiveness that a user senses as sufficiently immediate or that enables the computer to keep up with some external process (for example, to present visualizations of aggregated user session paths that constantly change responsive to new beacon data).

In the context of the present disclosure, the term "beacon" refers to data related to a user's experience on a particular website or web application collected by a library running on the browser of a client device, and sent to a server (e.g., a collector server) via Hypertext Transfer (or Transport) Protocol (HTTP), or some other protocol. In the case of a mobile app, the data gathered may be based on definitions contained in a configuration file that is periodically downloaded to the mobile device running the mobile app. For example, every user who runs a particular mobile app on their mobile device may also automatically download a configuration file every few minutes that defines the various metrics and/or timers to be gathered and beaconed back to a server from the user's mobile device in real-time as the user runs or uses the mobile app. In the case of a website, the library may, in one embodiment, be a JavaScript library running on the browser of a client device.

The server receiving the beacon information may aggregate that data along with similar data received from other users accessing the same website, web application, or mobile application. Any HTTP headers sent by the browser as part of the HTTP protocol may also be considered part of the beacon. A beacon may therefore be thought of as a page view on a website or application, but without a corresponding page. For every user who visits that website, the browser running the library on the user's client device measures various metrics (e.g., webpage load time) and records data that is then sent or "beaconed" back to a results server in ", real-time as the user navigates through or uses the website or application.

An "mPulse™ domain" refers to a web domain of a client or customer of a data analysis platform or program that provides an analytic dashboard window with visual information from real user measurement (RUM) data captured, collected and aggregated by a server-based system. The RUM data is typically beaconed from a user's mobile device, or other computing device, to a results server that collects and aggregates the data. The results server, or another server, may also perform statistical analysis on the RUM data, e.g., calculate an average or median load time.

In the context of the present disclosure, a "page group" refers to a logical collection of related webpages from a website. Page groups are defined by the website stakeholders, business analysts, operations engineers, or anyone else who may be an mPulse™ end user. For example, a typical partition of an online retailer's website might have the homepage(s) put into a page group called "Homepage", the product pages of a group called "Product Page", the search result pages in a group called "Search Results", etc.

A "conversion" refers to a user session on a website or web-based application that ultimately ends up with the user taking a desired action, such as, for example, purchasing a product or service. The term "conversion rate" therefore refers to the proportion of conversions to overall user sessions. The archetypical example of conversion rate is the percentage of website or mobile application ("app") visitors/ users who buy something on the website or app server. It should be understood that conversions are not necessarily equated with sales; that is, a conversion can represent any Key Performance Indicator (KPI). For example, a conversion can represent a user buying something on a site or app; a visitor becoming a registered user; allowing a site to store user information (e.g., a credit card number); downloading trial software; requesting more information about a service or product; reading a certain number of articles, or spending a certain amount of money; using a certain feature of an application; downloading an application to a mobile device and using it; or anything else that can be unambiguously counted by a computer that a website or application owner wants a user to do.

The conversion page of the website refers to the page group that defines when a user session has converted. Conversion pages typically have names such as "Thank You Page" or "Order Confirmation". When user session reaches the conversion page of a website, that session is then considered a conversion.

The term "session length" refers to the number of webpage views that occur in a particular user session. For example, if a user enters a website on the homepage and then proceeds to visit nine additional webpages on the website before leaving or logging off, then the length of that session is ten. A "bounce" is defined as a session whose session length is one. In other words, a bounce, occurs when a user session ends after requesting the first webpage (e.g., the landing page).

Test plan scenarios, or scenarios for short, are anticipated user paths through a website that generally incorporate multiple application activities (e.g., login, search, placing an item in a shopping cart, checkout, etc.). Paths may result in a conversion, a bounce, or abandonment. An abandoned path refers to a path that does not result or end in a conversion or a bounce. Test scenarios created using the methodologies disclosed herein are representative of user activity during an analyzed peak window.

A "message" generally refers to a unit of data that can be sent via an electronics communications network, e.g., the Internet, to another computational or communications system or device, e.g., to a server. By way of example, a message could represent a communication sent to a queuing system, a REST call, or a Hypertext Transfer Protocol (HTTP) request. A message could also be instantiated entirely or partially as a single operation, such as a web service call in any one of a variety of forms, e.g., XML, JMS, HTML, JSON, etc. A "message clip" (or "clip" for short) comprises a set of one or more messages that includes a specification of the location, timing and/or dependencies of objects or elements specified within that set of messages. A clip typically comprises a plurality (e.g., hundreds or thousands) of sequenced messages that form part of a larger load test composition.

In one embodiment, a system, method, and computer program product is utilized to autonomously create a highly accurate test plan based on real user measurement (RUM) data which captures real user experiences on a website or web application. In one example, 100% of a customer's or retailer's RUM beacon data is collected over a specified time period, e.g., 365 days. This data represents every user session, page request, and application action collected by the mPulse™ platform. This data is analyzed and processed by a computer program to create a performance test plan. In a specific embodiment, peak traffic periods are identified in the data and analyzed down to the day, hour, and second in order to find the highest levels of load serviced by the website or application during the specified time period.

In one implementation, the test plan is created based on a peak load model for the specified time period. In another embodiment, the peak load model may be increased by a specified traffic factor (e.g., 55%) in order to stress the website or application to above expected load levels to provide confidence in the performance and scalability of the website/application. In one embodiment, the resulting test plan may be automatically plugged into a load testing computer program product such as CloudTest® to immediately begin load testing.

Figure 1:
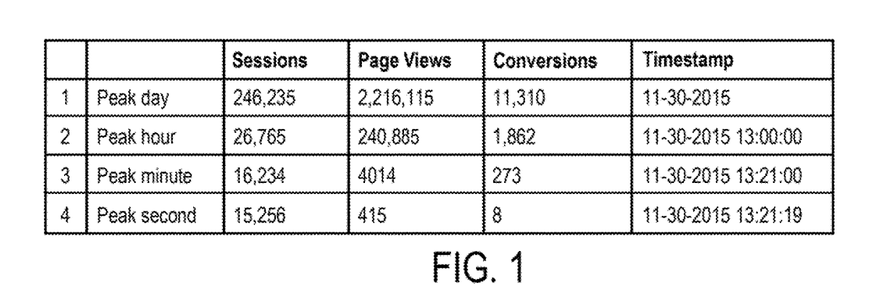
FIG. 1 is an example table showing peak values that are used to calculate various critical parameters for autonomous load test plan creation.

FIG. 1 is an example table showing peak values that are used to calculate various critical parameters for autonomous load test plan creation. As shown, the peak day, hour, minute, and second are listed for a specified time period, e.g., days, weeks, months, etc. In this example, the peak day for the specified time period (e.g., Jan. 1-Dec. 31, 2015) was Nov. 30, 2015, with 246,235 concurrent sessions, 2,216,115 page views and 11,310 conversions occurring on that day. Note that the historical information shown in the table of FIG. 1 represents real user measurement data collected from mPulse beacons. That is, this measurement data may be beaconed in real-time from user client devices (e.g., mobile devices, laptops, etc.) while actual users navigate through a customer's website or application. Each beacon is like a page hit from a real user with numerous parameters that describe the user's experience. For instance, beacons may describe the page load time experienced by the user, the geographic location of the user, browser type, operating system (OS) of the user's client device, etc. It is appreciated that the number of beacons collected for a given customer over a specified time period may number in the millions, or even billions.

As listed in FIG. 1, the peak hour, peak minute, and peak second are shown occurring on the same day. In other instances, these peak intervals could occur on different days of the specified period. For instance, a tax preparation software package available via a company's website may have the most overall traffic on April $15^{th}$, but the peak second may occur on January $31^{st}$, or in early February, when a simultaneous flood of early filers floods the website. In one embodiment, the peak hour, peak minute, and peak second are used to calculate various critical targets for the performance test plan. Practitioners will appreciate that the peak second might be missed if less than 100% of the RUM data is used. The peak second represents the fastest rate of flow the customer website can expect to experience; in other words, the maximum amount that the customer can expect their server(s) to be stressed.

In one implementation, the peak day is used to determine user session statistics for the test plan creation, such as session length, think time, etc. The peak hour data is used to determine page view targets and to create the load model. The peak second is used to determine the number of requests per second observed during the highest moment of concurrent traffic.

It is appreciated that the range of historical data selected for generating the information shown in FIG. 1 may be determined by user interface input. The range may comprise any length of time for which beacon data was collected and stored in a database, e.g., hours, days, weeks, months, and years.

Figure 2:
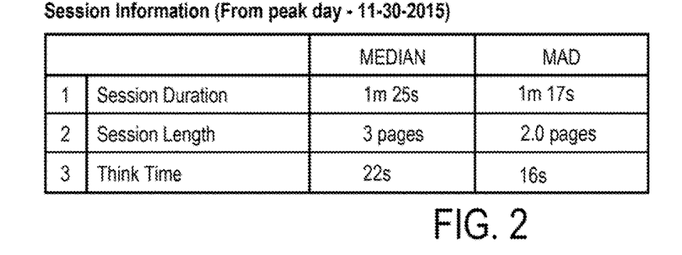
FIG. 2 is an example table containing information about real user behavior on a peak day.

FIG. 2 is an example table containing information about real user behavior on the peak day of Nov. 30, 2015. This table included the median time users spent on the website, the median session length, and the median think time. Also included is the Median Absolute Deviation (MAD) for each of these measured parameters. (The median absolute deviation of a set of data is the average distance between each data value and the mean. The MAD is a way to describe the variability of a set of data.)

Figure 3:
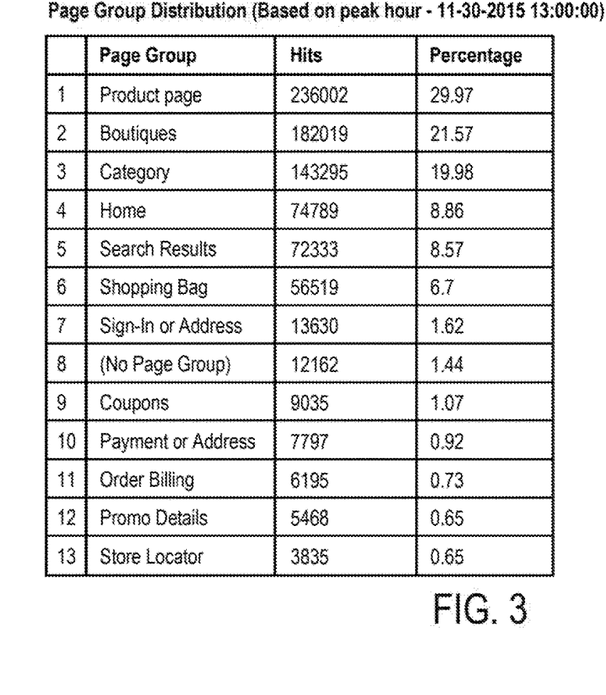
FIG. 3 is an example table showing a page group distribution that lists the most popular page groups hit during a peak hour.

FIG. 3 is an example table showing a page group distribution that lists the most popular page groups of a website or web application that were hit during the peak hour. In this example, the Product page group produced the greatest number of hits (236,002, or 29.97%) during the peak hour. It is appreciated that the summary of the most popular page groups hit during the peak hour may be illustrated in a variety of different forms, including as a histogram, pie chart, etc. One goal of the test plan creation software program described herein is to generate a Test Plan that, when executed, yields page group distribution that approximates, as close as possible, the real-world distribution shown in the table of FIG. 3.

Based on the peaks identified above, and the traffic observed during those peaks, a software program may be executed that produces a performance test plan that most accurately recreates the load observed during the specified time period, in addition to any optionally included buffer and expected increase in traffic. For example, a percentage increase may be applied over the observed peak to account for expected traffic growth, unplanned spikes, or to stress the system to identify architectural or application breaking points.

Figure 4A:
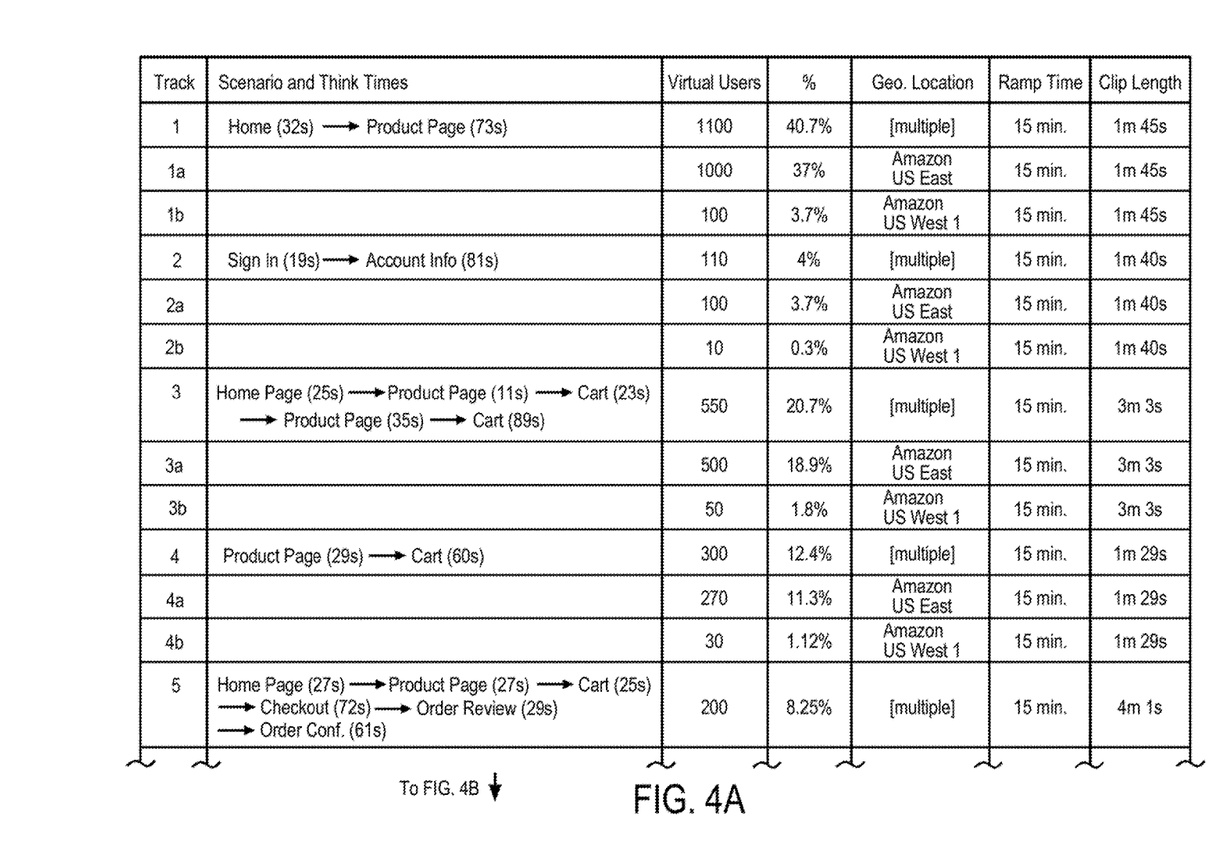
FIGS. 4A & 4B is an example master table that lists a set of load test scenarios and think times that accurately represents a distribution of paths taken by real users.
Figure 4B:
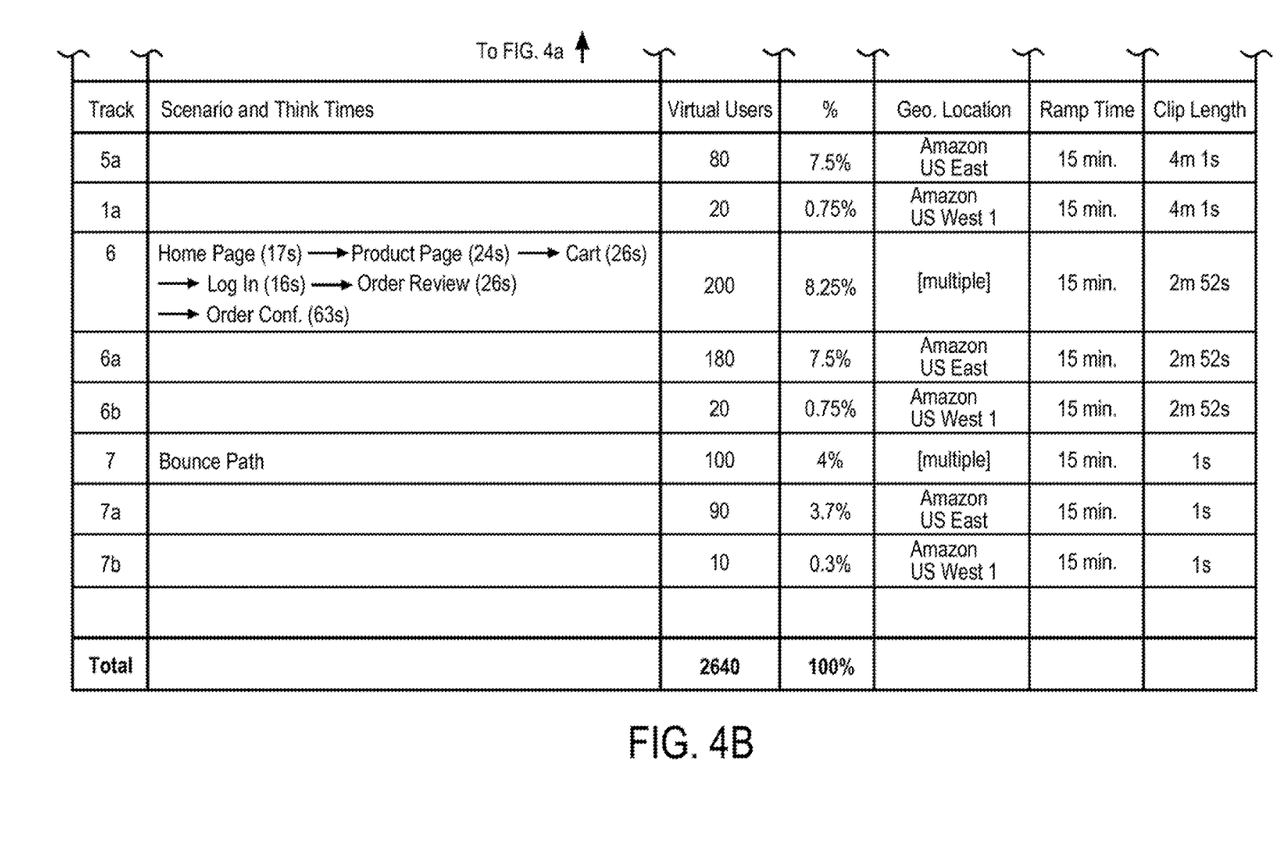

FIGS. 4A & 4B are an example master table that is produced by execution of the test plan creation program. The master table lists a set of load test scenarios and think times that accurately represents a distribution of paths taken by real users during the peak hour. The test plan shown in FIGS. 4A & 4B is easily reproduced and configured for use in the CloudTest® load testing platform. In one embodiment, the created test plan may be automatically converted and loaded into the CloudTest® load testing platform.

It is appreciated that supporting tables and additional visualizations may be produced to provide additional context for various elements of the plan, such as the scenario paths and virtual user distributions. The test plan shown in FIGS. 4A & 4B includes all of the recommended click paths, accurate think times for each page, the geographic locations from which the paths should be executed based on available public cloud providers, the number of virtual users recommended for each path, the ramp time used to achieve an accurate level of load on the system, and the length of time that the load test should be run. The geographical user distribution is provided to match the distribution of observed actual users as closely as possible, given the constraint of the limited number of Cloud Provider locations that are available to generate virtual users from. As discussed above, the test plan is designed to execute a stress test based on peak user activity. If the goal is to run different types of tests, such as baseline, capacity, or endurance tests, appropriate adjustments may be made to the test plan.

The test scenarios in the plan shown in FIGS. 4A & 4B are determined to be representative of real user activity during the analyzed peak window. On a normal to high traffic website or web application it is not uncommon to observe hundreds of thousands of unique click paths. As a practical matter, however, it is unnecessary to re-create such paths. In one embodiment, the algorithm utilized by the test plan creation software program examines every single one of those click paths to calculate the distribution of paths taken by users. It then creates the optimum number of test scenarios to accurately represent that distribution while achieving the desired load. Think times are calculated to provide a model that hits the correct number of page views for every page analyzed. The algorithm considers all of the outliers, but intelligently distills all of those page requests into the recommended paths.

Referring again to FIGS. 4A & 4B, each scenario is listed as a track of the load test composition, with all of the tracks being run in parallel during execution. For instance, the path shown as track 1 starts at the home page with a 32 second think time, followed by a click on the Product page and a 73 second think time. The total clip length is thus 1 minute, 45 seconds, with the virtual user distribution being divided between Amazon servers located in the US East (1000 VUs) and US West 1 (100 VUs), which are shown as sub-tracks 1a and 1b, respectively. The ramp time for each scenario is shown as 15 minutes, which means that the number of virtual users ramps up from zero to the final number indicated over a 15 minute interval.

Note that track 7 indicates a bounce path. The bounce path is a scenario that has been produced in this test plan along with the more normal test cases. The bounce path scenario accounts for the observed user behavior of hitting a single page and then leaving the site. Persons of skill in the art understand that bouncing is common on every website and web application; during peaks it can account for a large number of page views and sessions. In this test case, the most frequent bounce pages are identified. With shorter than typical think times (e.g., 1 second) the bounce path scenario is important for hitting the page targets in the load model. That is, the bounce path scenario fill in the cracks between a typical load test by hitting the pages listed at the percentage rate observed in the RUM data. For instance, the bounce path clip for the scenario shown in FIG. 4B may consist of three pages: Home page(1 s think time; 93%), Product page (1 s; 4%), and Category page (1 s; 3%). As with the other scenarios listed, the bounce path is shown being distributed geographically between the US East and US West 1 locations.

In one embodiment, various visual representations of the load model test plan distribution may be generated by the computer program. By way of example, in one embodiment each path may be represented as a series of connected circles, with the circles representing the page groups traversed and an associated cloud icon or notation indicating the corresponding think times for each page in the path. Another visual representation may show each test clip that will run as a graph plotting the visual user ramp by location versus time. Each geographic location may be represented by a separate line in the graph that shows how long each clip will take to ramp up to maximum load and duration. In one embodiment, the ramp is a conservative measure based on taking the fastest observed arrival rate and the fastest observed arrival acceleration over a one minute period, and extending that to what would happen if those peak rates were sustained until peak users are reached.

It is appreciated that a web application is often the sum of many different transactional areas, such as login, checkout, browse, search, and account management. In another embodiment, the test plan methodology described herein can be directed towards an individual page group, creating a plan that stresses that page group or transaction. For example, in one embodiment the user can direct test plan creation to find performance targets for an individual component or page group, e.g., "Search". The platform responds by isolating the peaks that were experienced for the Search function to produce a test plan that accurately tests Search. All key functional areas of a web application may be tested to and above their expected peaks.

Persons of skill in the art will understand that the software which implements the test plan creation platform may also be downloaded to the user's computer or implemented on a separate hardware appliance unit located either at the user's premises (e.g., behind the firewall) or anywhere in the cloud.

Figure 5:
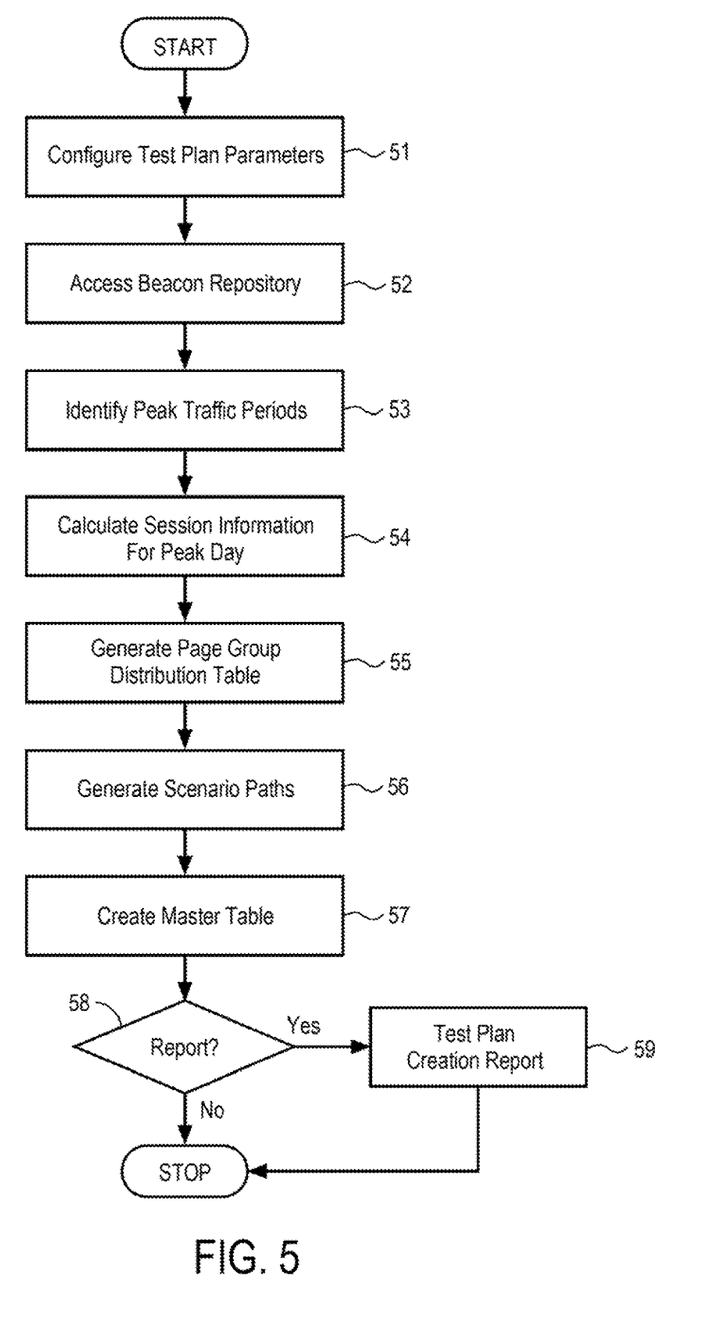
FIG. 5 is an example flow diagram of a method for autonomously creating a load test plan based on historical real user data.

FIG. 5 is an example flow diagram of a method for autonomously creating a load test plan based on historical real user data. The process begins with the configuring of the test plan parameters, which are the logically required user inputs for the test plan creation program. (Block 51) In one embodiment, the following parameters may be configured by the user.

startTime=# Beacon range start time timestamp.
endTime=# Beacon range end time timestamp.
maxPaths=# this is a hard limit on the maximum number of user paths that can be suggested; default value is 20.
maxConversionPaths=# this is the maximum number of conversion paths to be included in the suggested test plan paths; if this tenant is not a retailer or does not have the concept of a "conversion", then leave maxConversionPaths=0 (the default); if conversions apply, 0<maxConversionPaths≤maxPaths.
growthFactor=# this is a scalar to multiply the base test plan estimates for virtual user counts, accounting for projected traffic growth; to test for 20% growth, use growthFactor=1.2; to test for −10% growth, use growthFactor=0.90; the default value is growthFactor=1.0 (no growth).
peakRampDatepart=# peak arrival rate and peak arrival acceleration is calculated by this datepart to determine ramp time. It is recommended to use minutes for a typical 1-hour load test, hours for a longer-running reliability test, and seconds for a shorter spike test. Default value is minute.
peakUserDatepart=# peak concurrent sessions is calculated by this datepart. Page group distribution and path analysis is based on the peak datepart in terms of concurrent sessions. The default value is :hour.

minPageCoverage=# this defines the minimum coverage of page groups, as a percentage, that the user paths should account for, minPageCoverage=85.0 means that all the page groups that account for at least 85% of all hits are covered; default value is 80.0.

minBouncePageCoverage=# this defines the minimum coverage of landing pages, as a percentage, that the dynamic bounce path should account for;

minBouncePageCoverage=85.0 means that all of the landing pages that account for at least 85% of all bounces are covered; default value is 80.0.

sesslionTimeout=# this is the application's session timeout value in minutes; the default value is 30.

The next step in the process of FIG. 5 is a query to the beacon repository (e.g., disk storage) for the purpose of accessing and retrieving all beacons for the specified time period range. (Block 52) The retrieved set of beacon data is then analyzed to identify peak traffic periods. This includes finding the peak hour, day, minute and second. (Block 53) Once the peak hour had been identified, the next step is to calculate session information for the peak day. (Block 54) In one embodiment, this information includes the median and MAD values for session length, the average (or median) number of pages per session, and average (or median) think times between clicks.

After the peak day session information has been calculated, the page group distribution table is generated for the peak hour. (Block 55) This table shows the volume of hits for every page group during the peak hour. At this point, the scenario paths for the test plan are generated. (Block 56) This is an algorithmic part of the process which involves generating representative test case scenarios, which includes the special bounce path scenario and all other required test case scenarios. Next, the master table is created. (Block 57) The master table contains a break out of each scenario generated in the previous step, split out by geographic location. Each entry also contains the ramp time for each scenario and think times.

Once the master table has been created the program provides the user with the option to generate test plan creation report. (Block 58) The report is generated when an affirmative response is received. (Block 59). In either case, the master table, scenario paths, all results and associated information is saved to a memory or storage location (e.g., RAM, disk, etc.)

Figure 6:
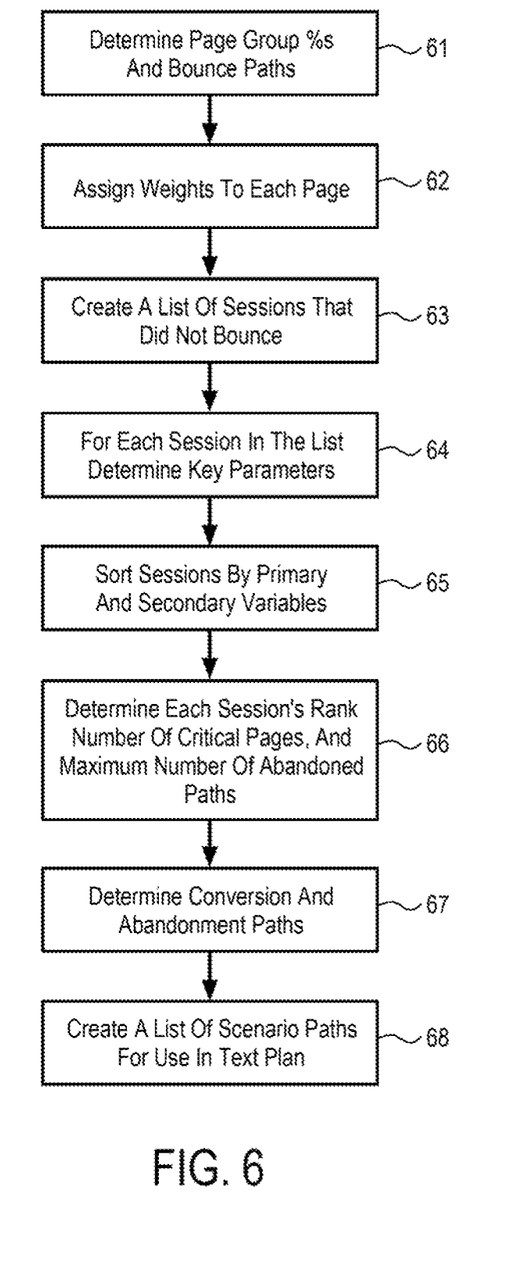
FIG. 6 is an example flow diagram of a process for generating test case scenarios representative of real user data.

FIG. 6 is an example flow diagram of a process for generating test case scenarios representative of real user data. The process begins with the determination of the page group percentages and bounce paths. (Block 61) These determinations are made from the beacon data for the time period range of interest. A list of all page groups and their observed hit percentages, relative to all other page groups, is generated. These percentages are referred to as the overall page group hit percentages.

In one embodiment, the bounce paths are determined by first calculating the bounce rate and tabulating a list of all landing pages where sessions have bounced. For each of these "bounce pages", the percentage of sessions that bounce on that page is determined, relative to the other bounce pages. These are the bounce path percentages. According to the user-specified number minBouncePageCoveragq a determination is made as to how many of the above bounce paths to use in the test plan. This may be done by first ranking the bounce paths by their bounce path percentage, from highest to lowest, and then calculating the cumulative bounce path percentage, starting from the highest percentage bounce path. Those bounce paths where the cumulative bounce path percentage is less than or equal to minBouncePageCoverage are selected to be included in the test plan.

The next step in the process is to assign weights to each page group according to its popularity. (Block 62) The overall page group hit percentages are used to determine a page group's weight. By way of example, if a page group has an overall hit percentage of 27.6%, that page group is assigned a weight of 28. In other words, a page group's weight is its overall hit percentage rounded to the nearest integer.

Continuing with the process of FIG. 6, a list of all observed user sessions where the session did not bounce (i.e. session length >1) is created. (Block 63) For each of these distinct sessions a determination of a set of key parameters is made. (Block 64) In one embodiment, these parameters may include:

The actual path, which is the sequence of page groups traversed by the user. For example, Home→Search→Category→Cart→CheckoutAddress→Checkout-Billing→OrderConfirmation could be one actual path.

The page group list, which is the list of distinct page groups involved with the actual path, without regard for sequence of page groups or number of occurrences of page groups. Consider, by way of example, these two distinct paths: Home→Search→Category and Home→Search→Category→Search→Category→Home. These two paths are distinctly different, but they both have the same page group list; namely Category, Home and Search.

The session's total page group weight. Using the weights from block 62, all page group weights from the actual path are summed together.

The entry page & exit page, which are the first page and the last page in the actual path, respectively.

The absolute session length deviation, which is the absolute value of the difference between the session's length, and the median session length for all sessions that have the same entry and exit pages.

The absolute session duration deviation, which is the absolute value of the difference between the session's duration, and the median session duration for all sessions that have the same entry and exit pages.

The exit-entry proportion, which is the proportion of all sessions having the exact same entry page and exit page.

The exit-entry weight, which is the number of sessions having the same entry and exit page combination.

The exit-entry max paths, calculated by multiplying the exit-entry proportion by maxPaths (specified by user), and then rounding up to the nearest integer. This is an indicator placed on each session to determine the maximum number of paths with the same entry and exit page to be included in the test plan. Note that any two sessions having the same entry and exit pages will also have the same exit-entry max paths.

isConversion, which is a Boolean indicator for whether this session resulted in a conversion or not. In one implementation, isConversion=0 indicates an unconverted session and isConversion=1 indicates a converted session.

A primary sort variable, which is the ratio of absolute session length deviation to total page group weight.

A secondary sort variable, which is the ratio of absolute session duration deviation to exit-entry weight.

After the above parameters are calculated by the test plan creation program, all of the sessions are sorted. (Block 65) First, the sessions are ordered by the primary sort variable, in ascending order. Next, the sessions are ordered by the secondary sort variable, in ascending order. At this point, a number of further determinations are made. (Block 66) A determination of each session's representative rank is made by giving it the value of the position in the sorted list. For example, the ith session (where i is an integer) in the sorted list is assigned a representative rank of i. Each session's page group list rank is determined by first partitioning the sessions according to their entry and exit pages (all sessions with the same entry and exit page in the same partition). Within each of these partitions, the sessions are ranked by their representative rank. For example, in any particular exit-entry page partition, the session(s) with the rth highest representative rank will have a page group list rank of r. Note that this partitioning of data by exit-entry page does not change the overall sorted order of sessions from block 65.

The number of critical page groups is also determined by sorting the list of page groups from block 61 in descending order according to their overall page group hit percentage. From highest percentage to lowest, the cumulative page group hit percentage is calculated. The number of critical page groups is the number of page groups from this list where the cumulative page group hit percentage is less than or equal to minPageCoverage (specified by user input).

Finally, the max number of abandonment paths is calculated as min(maxPaths−maxConversionPaths−1, numCriticalPageGroups) where numCriticalPageGroups is the number of critical page groups. Note that the number of abandonment paths refers to the number of paths that are neither conversion paths nor bounce paths.

The next step in the example flow diagram of FIG. 6 is the determination of abandonment and conversion paths to be included in the test plan. (Block 67) This involves first dividing the sorted list of all user sessions into two groups: converted sessions and unconverted sessions, as indicated by the isConversion variable, keeping the same sort order within the respective divisions. In one embodiment, the abandonment paths may be determined from the unconverted sessions by filtering out sessions that do not provide enough page group diversification for the test plan, taking only those sessions that meet the following criteria: (1) Page group list rank=1, which ensures that the test plan will not produce two paths having the exact same page group list; (2) The number of page groups in the page group list is greater than one; and (3) The representative rank is <=exit-entry max paths, which ensures that there are not too many paths in the test plan with the same entry and exit page. After filtering, the number of abandonment sessions may be limited by selecting the top k paths from the sorted list of sessions, where k=max number of abandonment paths. The actual paths from these sessions are the abandonment paths that are utilized in the load test plan.

The conversion paths for the test plan may be determined from the converted sessions, following the same filtering algorithm described above for determining the abandonment paths. Then take the top j paths from the sorted list of sessions, where j=maxConversionPaths. The actual paths from these sessions are the conversion paths for use in the load test plan. At block 68 the list of scenario paths for use in the load test plan is created by combining the list of bounce, abandonment, and conversion paths generated above (Blocks 63 and 67). It is appreciated that the bounce paths may be structured differently, in that they together form a single dynamic path. It is worth noting that each test plan has only one bounce scenario (i.e., a single page path), where the page involved is randomized according the bounce path percentages determined in block 61.

Figure 7:
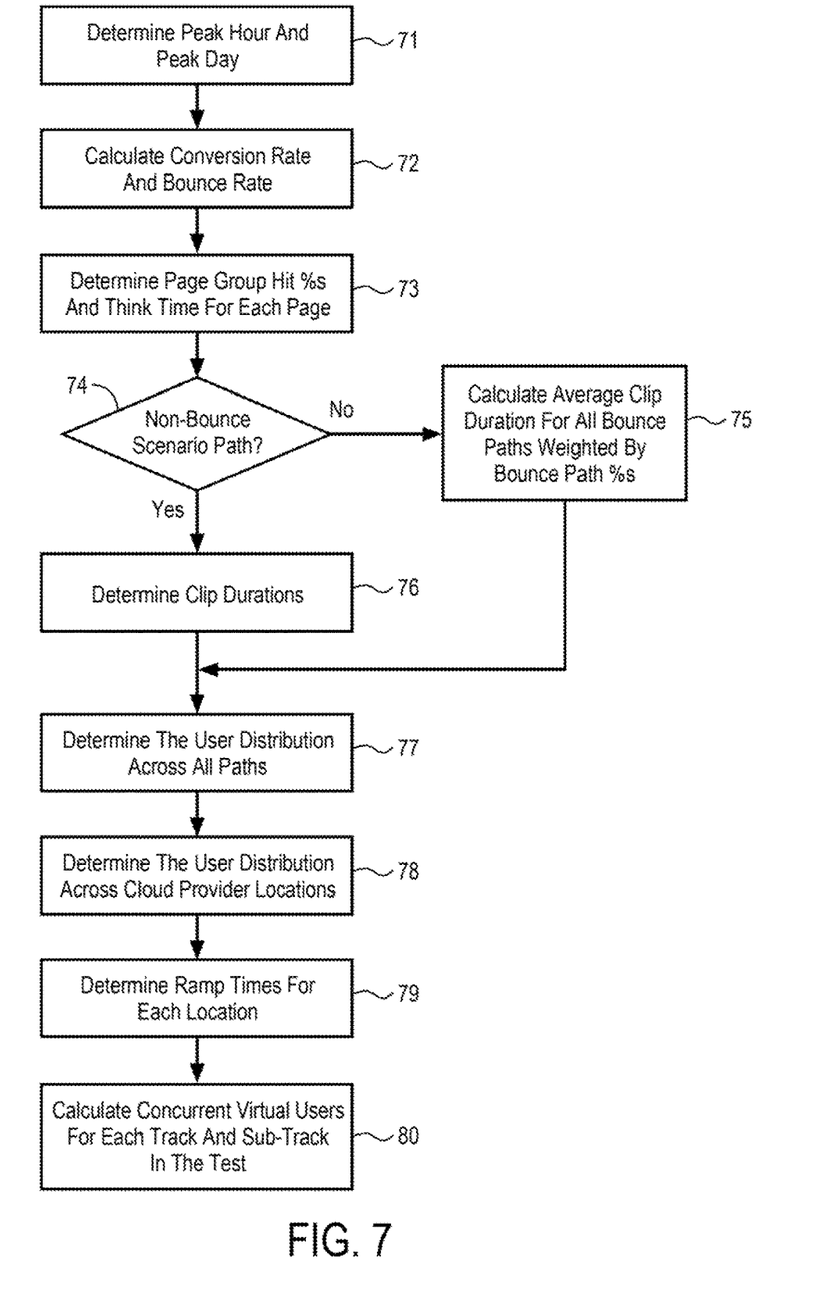
FIG. 7 is an example flow diagram of a process for creating a master table containing a break out of each scenario generated in FIG. 6.

FIG. 7 is an example flow diagram of a process for creating a master table containing a break out of each scenario generated in FIG. 6. The first step in the process is the determination of the peak hour and peak day. (Block 71) These are the one hour period and the twenty-four hour period, respectively, when the most concurrent user sessions occurred during the specified time range under analysis. The peak hour sessions and peak day sessions may be defined as the number of concurrent sessions that occurred during the peak hour and peak day, respectively. Next, the conversion rate may be calculated as the number of sessions that converted divided by the number of all concurrent sessions during the peak hour (Block 72) By way of example, the additional information may include the name of the first page view in the path. Similarly, the bounce rate may be calculated as the number of sessions with a session length of one divided by the number of concurrent sessions during the peak hour.

As discussed previously, page group percentages may be determined from a list of all page groups and their observed hit percentages, relative to all other page groups. (Block 73) The term "overall page group hit percentages" refers to these percentages. In addition to the hit percentages, the median think time for each page group is also determined in this step. The median think time is the median length of time that passes after users hit that page until they make the next request.

At decision block 74 a query is made as to whether there are non-bounce scenario paths, which refers to abandonment paths plus conversion paths. If so, for each of the non-bounce scenario paths the clip durations are determined. (Block 76) The clip duration refers to the expected amount of time that it takes a virtual user to traverse the path, based on the observed median page load times and the observed median think times for all page groups involved in the path. For the bounce path scenario, the clip duration is calculated as the average clip duration for all bounce paths, weighted by the bounce path percentages. (Block 75)

Continuing with the example of FIG. 7, the next step in the process is the determination of user distribution across all paths. (Block 77) This involves setting the proportion of users assigned to the dynamic bounce path to be equal to the calculated bounce rate. Likewise, for conversions, the total proportion of all users assigned to the conversion paths is set to be equal to the calculated conversion rate. To determine the proportion of users for each individual conversion path, in one embodiment the following sub-steps are performed. First, an m×n matrix A is created, where m is the integer number of conversion paths involved, and n is the integer number of page groups from block 73. An n×1 vector x is also created. The page group percentages are then converted to proportions, which are then used to initialize the vector x. (Block 77) The order of the proportions is from largest to smallest. The matrix A is then used to enumerate the number of each of the different page groups involved in the conversion paths. This is done by using the rows of A to represent the conversion paths, and the columns of A to represent the number of each of the different page groups involved in those paths. The columns of A map to the same order of page groups from x.

The equation Ax=b may be utilized, where b is the solution vector containing the proportion of conversion users (not the proportion of all users) assigned to each conversion path. Note that b is an m×1 vector. The scalar c may be used as the conversion rate. The m×1 vector $\beta$ may be calculated as $\beta$=cb. This vector contains the total proportion of all users that should be assigned to each conversion path. The nth element in $\beta$ is the user proportion that should be assigned to the conversion path represented by the nth row of A. Let c=the conversion rate, and let d=the bounce rate. The total proportion of all users assigned to the abandonment paths is set equal to the abandonment rate a, which is calculated as a=100−(c+d).

To determine the individual proportions of each of the abandonment paths we follow a similar procedure as for the conversion paths. In the case of the abandonment paths, the rows (m) of matrix A represent the abandonment paths, and the columns (n) of A represent the number of each of the different page groups involved in those paths. For the abandonment paths, the m×1 vector β is calculated as 3=ab. This vector contains the total proportion of all users that should be assigned to each abandonment path. The nth element in β is the user proportion that should be assigned to the abandonment path represented by the nth row of A.

The foregoing calculations produce the optimal proportion of virtual users that should execute each of the paths involved in the test plan. These are proportions of cumulative users. Cumulative users refer to the sum total of users after the test has finished executing. The actual number of virtual users shown in the test composition table refers to concurrent users, i.e., the active number of virtual users that should be concurrently executing each scenario while the test is executing. To determine these concurrent user numbers, the ramp times need to be determined for each scenario, in addition to the clip durations calculated above.

In block 78 the user distribution across cloud provider locations is determined. This involves obtaining a list of latitude and longitude coordinates for the nearest cities to each of the available cloud provider data center locations.

In one embodiment, each row is re-visited once all paths for the diagram page have been processed. This is to find all elements between points of convergence and divergence, or between points of convergence and terminating elements, and to space the elements/nodes evenly between these points. In one implementation, this information is stored in a csv file called CloudProviders.csv. For all sessions in the beacon data, use the observed latitude & longitude coordinates—representing the geographical locations for each real user—to calculate the physical distance between those users and desired cloud provider locations to be used in the test plan. In one embodiment, the haversine formula is used to calculate spherical distances in this context. The haversine formula determines the great-circle distance between two points on a sphere given their longitudes and latitudes. In other embodiments, a different formula may be used to calculate distances between users and cloud providers. For each observed session a cloud provider location is assigned that has the smallest spherical distance to that user. After each real user session in the beacon data has been assigned a cloud provider location, the overall proportion of cumulative users that should come from each of the cloud provider locations in the test plan may be calculated.

Next, the ramp times for each cloud provider location are determined. (Block 79) The ramp time for a particular scenario is defined as the amount of time (e.g., in minutes) it should take the test to reach the peak number of concurrent users executing that scenario, starting from zero users. This can be performed in several steps. First, for each cloud provider location, the peak arrival rate is determined. The peak arrival rate is the observed peak rate of session starts (new sessions or incoming users). If peakRampDatepart=: minute, then the measurement unit of the arrival rate is sessions/minute. For each cloud provider location, the peak arrival acceleration, which is the observed peak rate of arrival rate, is determined. If peakRampDatepart=:minute, then the measurement unit of the arrival acceleration is sessions/minute$^2$. For each cloud provider location, the ramp time is calculated as: Ramp time=(# of cloud provider locations)(peak arrival rate/peak arrival acceleration).

At this point, peak hour sessions, clip durations, user distribution across paths, user distribution across cloud provider locations, and ramp times by cloud provider location have all been determined. Now the concurrent virtual users for each track and sub-track in the test composition table may be calculated. (Block 80) For each sub-track, which corresponds to a different cloud provider location under an associated main track, the number of concurrent virtual users is defined as:

$$\text{Virtual Users} = p \cdot D[h/(t-(r/2))]$$

where p is the proportion of users from this cloud provider location, as determined by block 78; r is the ramp time for this location, as determined by block 79; h is the peak hour sessions; t is the user defined testDurationMinutes (by default equal to 60); and D is the clip duration for this track's scenario path, as determined by block 76.

The total concurrent users for each main track may be calculated as the sum of the number of virtual users for all of its associated sub-tracks.

Figure 8:
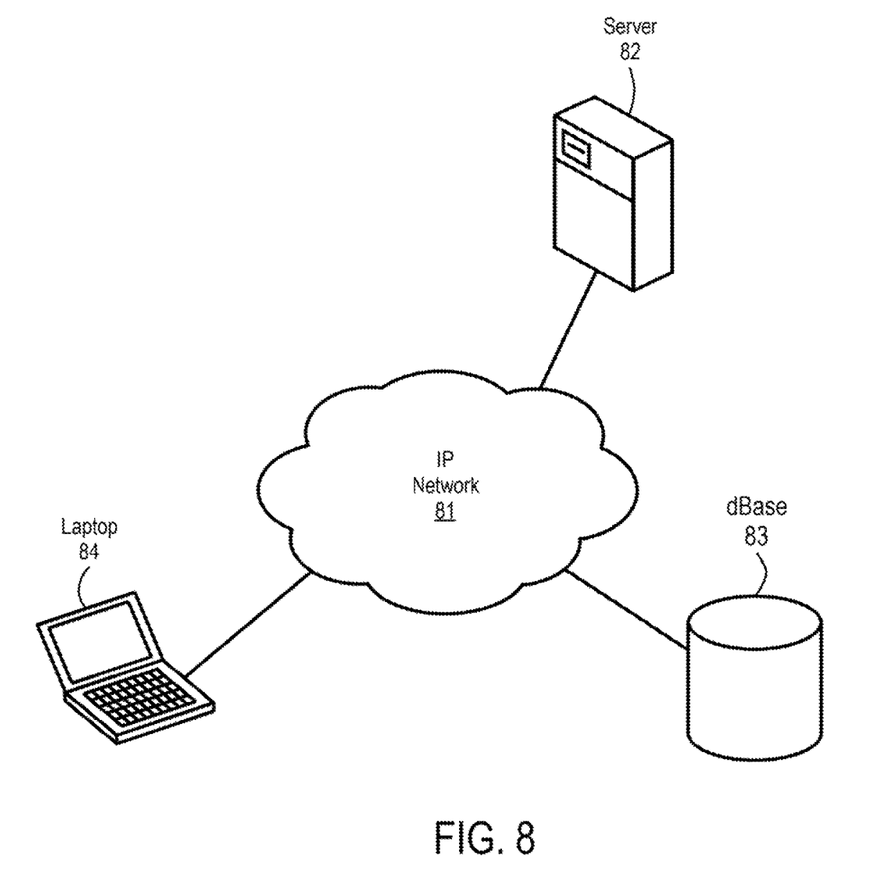
FIG. 8 is an example architectural diagram of a system for automatically creating a load test plan.

FIG. 8 is an example high level architectural diagram of a system or load test platform for automated creation of a load test plan in accordance with the embodiments described above. As shown, the system includes a server 82 connected via a cloud 81 with a laptop computer 84 and a database 83. Cloud 11 may comprise an Internet Protocol (IP) network, such as the general public Internet, or an intranet private computer network confined to an organization that uses IP technology or a combination of private and public networks. Laptop computer 84 may alternatively comprise one or more computing devices, including mobile devices, desktop computers, or any other computing device that is configured to accept user input, communicate with server 82, and display output results/reports. Similarly, server 12 shown in FIG. 1 may comprise a single server (as shown) or a plurality of servers, either located at a single center or distributed across different geographical locations.

In the embodiment shown, the cloud-based load testing platform comprises a computer program that executes on server 82 for automatically creating a load test plan utilizing beacon data archived on database 83. In other embodiments, the computer program may be downloaded to execute on laptop 84. Database 83 may comprise any memory or storage device that may be accessed by server 82 and/or laptop 84. Server 12 communicates with laptop 13 via a browser application running on laptop 12. In one implementation, the computer program running on server 82 operates to create a graphical user interface (GUI) that allows a user of laptop 84 to remotely interact with the test creation program. In this way, a user of laptop computer 84 may enter input parameters needed for the test plan creation software. The resulting test plan generated by the program may be displayed in a report on the display screen of laptop 84. In one embodiment, a graphical user interface generated by the program allows the user to convert the test plan into a load test composition for execution on a CloudTest® load testing platform or other compatible load testing program. That is, via laptop 84 a user may initiate creation of the test plan by providing appropriate input to the computer program running on server 82. In response, server 82 may execute the method steps described above, which includes accessing database 83 to retrieve the beacon date for the user-specified time period range, also compose a test composition comprising a collection of recorded clips obtained from the capture of one or more inputs obtained from one or more mobile devices. In other words, gesture-based inputs or commands may be captured from different devices, or from the same device taken at different times and under different conditions and collected in a database or library associated with server 12.

It should be understood that elements of the disclosed subject matter may also be provided as a computer program product which may include a machine-readable medium having stored thereon instructions which may be used to program a computer (e.g., a processor or other electronic device) to perform a sequence of operations, such as those described above. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for creation of a test plan for load testing a website or web application comprising:
   receiving a set of input parameters, which includes a specified time period range;
   retrieving, from a data storage repository, beacon data of real user sessions on the website or web application that fall within the specified time period range;
   identifying, from the beacon data, a set of peak traffic time periods, which includes a peak day, a peak hour, a peak minute, and a peak second;
   calculating user session statistics for the peak day, the user session statistics including median session duration, session length, and think times;
   generating a page group distribution table that includes a list of all page groups and page group hit percentages, relative to all other page groups, for the real user sessions during the peak hour; and
   generating a set of test scenario paths representative of the page group distribution table.

2. The computer-implemented method of claim 1 wherein the generating of the set of test scenario paths comprises:
   a) assigning weights to each page group in accordance with the page group hit percentage of the page group;
   b) creating a list of all the real user sessions during the peak hour having a session length greater than 1, for each real user session in the list determining:
      (i) an actual path, which is a sequence of page groups traversed by the real user;
      (ii) a page group list which includes distinct page groups in the actual path;
      (iii) a total page group weight, which is a sum of all the page group weights for the actual path;
      (iv) a session length deviation, which is an absolute value of a difference between a session length of the real user session and the median session length;
      (v) a session duration deviation, which is an absolute value of a difference between a session duration of the real user session and the median session duration;
      (vi) an exit-entry proportion, which is a proportion of all the real user sessions that have the same entry and exit pages;
      (vii) an exit-entry weight, which is a number of real user sessions that have the same entry and exit pages;
      (viii) an exit-entry max paths, which is calculated by multiplying the exit-entry proportion by a specified number that limits the maximum paths;
      (ix) a primary sort variable, which is a ratio of the session length deviation to the total page group weight; and
      (x) a secondary sort variable, which is a ratio of the session duration deviation to the exit-entry weight;
   c) sorting the list of all the real user sessions during the peak hour by the primary sort variable, and then by the secondary sort variable;
   d) assigning a representative rank to each session according to position in the sorted list;
   e) determining a number of critical page groups by sorting the list of all page groups in descending order according to the page group hit percentage of the page group, the number of critical page groups being equal to a number of page groups from the sorted list of all page groups where a cumulative page group hit percentage is less than or equal to a minimum specified page coverage;
   f) selecting a top n unconverted session paths from the sorted list of all the real user sessions, where n is a specified maximum number of abandonment paths, top n unconverted session paths comprising abandonment paths of the set of test scenario paths; and
   g) selecting a top n converted session paths from the sorted list of all the real user sessions, where n is a specified maximum number of abandonment paths, top n unconverted session paths comprising conversion paths of the set of test scenario paths.

3. The computer-implemented method of claim 1 further comprising creating a master table that lists the set of load test scenarios and the think times that represents a distribution of paths taken by real users during the peak hour.

4. The computer-implemented method of claim 2 wherein the selecting of the top n unconverted session paths further comprises only selecting unconverted sessions that meet a filtering criteria.

5. The computer-implemented method of claim 4 wherein the filtering criteria comprises a number of page groups in the page group list is greater than 1, and the representative rank is less than or equal to the exit-entry max paths.

6. The computer-implemented method of claim 2 wherein the selecting of the top n converted session paths further comprises only selecting converted sessions that meet a filtering criteria.

7. The computer-implemented method of claim 6 wherein the filtering criteria comprises a number of page groups in the page group list is greater than 1, and the representative rank is less than or equal to the exit-entry max paths.

8. The computer-implemented method of claim 1 where in the generating a set of test scenario paths comprises determining one or more bounce paths for inclusion in the set of test scenario paths.

9. The computer-implemented method of claim 8 wherein the determining of the one or more bounce paths comprises:
   generating a list of distinct landing pages for the real user sessions that have a session length equal to 1;
   determining a bounce path percentage for each distinct landing page in the list, the bounce path percentage being calculated as a percentage of sessions that bounced on the distinct landing page relative to other landing pages in the list;

ranking the list of distinct landing pages according to the bounce path percentage, from highest to lowest;

calculating a cumulative bounce path percentage, starting from a highest bounce path percentage, for each distinct landing page in the ranked list; and selecting as the one or more bounce paths for inclusion in the set of test scenario paths, those distinct landing pages where the cumulative bounce path percentage is less than or equal to a specified minimum bounce path coverage.

* * * * *